(12) United States Patent
Beecroft

(10) Patent No.: US 8,774,063 B2
(45) Date of Patent: Jul. 8, 2014

(54) METHOD OF DATA DELIVERY ACROSS A NETWORK

(75) Inventor: Jon Beecroft, Bristol (GB)

(73) Assignee: Cray UK Limited, Reading (GB)

( * ) Notice: Subject to any disclaimer, the term of this patent is extended or adjusted under 35 U.S.C. 154(b) by 519 days.

(21) Appl. No.: 12/992,875

(22) PCT Filed: May 13, 2009

(86) PCT No.: PCT/GB2009/001202
§ 371 (c)(1),
(2), (4) Date: Nov. 15, 2010

(87) PCT Pub. No.: WO2009/138745
PCT Pub. Date: Nov. 19, 2009

(65) Prior Publication Data
US 2011/0075592 A1    Mar. 31, 2011

(30) Foreign Application Priority Data
May 15, 2008    (GB) .................................. 0808862.7

(51) Int. Cl.
*H04L 5/14*    (2006.01)
(52) U.S. Cl.
USPC .......................................... 370/276; 370/248
(58) Field of Classification Search
None
See application file for complete search history.

(56) References Cited

U.S. PATENT DOCUMENTS 4,422,171 A * 12/1983 Wortley et al. ............... 714/748
4,644,468 A *  2/1987 Doster et al. .................. 709/220

(Continued)

FOREIGN PATENT DOCUMENTS

CN    101052024 A    10/2007

OTHER PUBLICATIONS

Wang et al., Adaptive Multipath Source Routing in Ad Hoc Networks, Aug. 7, 2002, Communications, 2001. ICC 2001. IEEE International Conference on Communications, pp. 867-868.*

(Continued)

*Primary Examiner* — Hassan Kizou
*Assistant Examiner* — Tejis Daya
(74) *Attorney, Agent, or Firm* — Craig J. Lervick; Larkin Hoffman Daly & Lindgren Ltd.

(57) ABSTRACT

The present invention provides a method of preserving packet ordering in a multi-path network having a plurality of network elements interconnected by network links wherein for each data packet arriving at an egress port of the multi-path network, a delivery acknowledgement is issued by the egress port and is transmitted across the network following in reverse the path taken by the data packet being acknowledged, and wherein the state of each link in the path taken by the data packet being acknowledged is updated by the acknowledgement. The present invention further provides a multi-path network for use in a bridge, switch, router, hub or the like, the multi-path network comprising a plurality of network ports; a plurality of network elements; and a plurality of network links interconnecting the network elements and the network ports for transporting data packets, each network egress port including acknowledgement means for issuing a delivery acknowledgement in response to receipt of a data packet and each network element being adapted to transmitted a delivery acknowledgment in the opposite direction along the path taken by the data packet being acknowledged and being further adapted to update the state of at least one of the network links to which it is connected in response to receipt of an acknowledgement. The invention further provides an Ethernet bridge or router incorporating such a multi-path network.

32 Claims, 7 Drawing Sheets

(56) References Cited

U.S. PATENT DOCUMENTS

| | | | | |
|---|---|---|---|---|
| 5,170,393 | A | * | 12/1992 | Peterson et al. .............. 370/255 |
| 5,237,566 | A | * | 8/1993 | Brand et al. ................. 370/426 |
| 6,690,646 | B1 | * | 2/2004 | Fichou et al. ................ 370/231 |
| 2003/0023749 | A1 | * | 1/2003 | Lee et al. .................... 709/240 |
| 2004/0152452 | A1 | * | 8/2004 | Jones et al. ................ 455/412.1 |
| 2004/0179598 | A1 | * | 9/2004 | Zhou et al. ............... 375/240.11 |
| 2005/0002334 | A1 | * | 1/2005 | Chao et al. .................... 370/230 |
| 2006/0023634 | A1 | * | 2/2006 | Morandin .................... 370/252 |
| 2006/0168317 | A1 | * | 7/2006 | Charzinski et al. ........... 709/238 |
| 2007/0041319 | A1 | * | 2/2007 | Chilukoor et al. ............ 370/235 |
| 2007/0073822 | A1 | * | 3/2007 | Bennett et al. ................ 709/206 |
| 2007/0230352 | A1 | | 10/2007 | Kokku et al. |

OTHER PUBLICATIONS

Michael Rogers et al: "A Lightweight Mechanism for Dependable Communication in Untrusted Networks" Dependable Systems and Networks, 2007. DSN '07. 37th Annual IEEE/IFIP International Conference on, IEEE, PI, Jun. 1, 2007, pp. 430-439, XP031116446 ISBN: 978-0-7695-2855-7.

Lei Wang et al: "Adaptive multipath source routing in ad hoc networks" ICC 2001. 2001 IEEE International Conference on Communications. Conference Record. Helsinky, Finland, Jun. 11-14, 2001; [IEEE International Conference on Communications], New York, NY : IEEE, US, vol. 3, Jun. 11, 2001, pp. 867-871, XP010553125 ISBN: 978-0-7803-7097-5.

Ka-Cheong Leung et al: "An Overview of Packet Reordering in Transmission Control Protocol (TCP): Problems, Solutions, and Challenges" IEEE Transactions on Parallel and Distributed Systems, IEEE Service Center, Los Alamitos, CA, US, vol. 18, No. 4, Apr. 1, 2007, pp. 522-535, XP011172541 ISSN: 1045-9219.

International Search Report; mailed Aug. 26, 2009; Stefano Ramenzoni, Authorized officer.

* cited by examiner

METHOD OF DATA DELIVERY ACROSS A NETWORK

BACKGROUND

Technical Field of the Invention

The present invention generally relates to a method of data delivery across a network and in particular to a method of preserving packet ordering in multi-path networks and a multi-path network implementing the method. The method and multi-path network are suitable for use in, but not limited to, multi-processor networks such as storage networks, data centres and high performance computing. In particular, the present invention is suited for use in bridges, switches, routers, hubs and similar devices including Ethernet devices adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article which described in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
3. Network Layer is responsible for network-wide communication, routing packets over the network between end-stations. It must accommodate multiple Data Link technologies and topologies using a variety of protocols, the most common being the Internet Protocol (IP)
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

For the purposes of this discussion we need not consider operations above the Transport Layer as it should, if well implemented, shield higher layers from issues arising in and below its scope.

Network Interconnections

A device that implements network services at the Data Link Layer and above is called a station. The Physical Layer is excluded from this definition as it is not addressable by a protocol. There are two types of station:
1. End Stations are the ultimate source and destination of network data communication across the network.
2. Intermediate Stations forward network data generated by end stations between source and destination.

An intermediate station which forwards completely at the Data Link Layer is commonly called a Bridge; a station which forwards at the Network Layer is commonly called a Router.

Network stations attached to an Ethernet network exchange data in short sequences of bytes called packets or Protocol Data Units (PDU). PDUs consist of a header describing the PDUs destination and a body containing the payload data. In the OSI model the PDU has a distinct name at each protocol layer. A Physical Layer PDU is called a stream, at the Data Link Layer the PDU is a frame, at the Network Layer the PDU is a packet and at the Transport Layer the PDU is called a segment or message.

PDUs are encapsulated before being transmitted over the physical Ethernet hardware. Each encapsulation containing information for a particular OSI Layer, the Ethernet stream encapsulates a frame which in turn encapsulates a packet which encapsulates a message and so on. This encapsulation containing headers and payload is finally transmitted over the network fabric and routed to the destination. In a network that contains multiple paths between two devices it is possible for consecutive PDUs to be routed to the destination out of order, with one overtaking the other by taking an alternate, shorter route to the destination. Even though the PDUs have the same destination they can be routed along different segments of a network by the interconnecting bridges that join the separate network segments. Uncorrected, mis-ordered PDUs would cause problems at the destination as the data would become corrupted, no longer being a complete byte-for-byte copy of the original source data.

At the Transport layer, an associated standard, the Transmission Control Protocol (TCP), in addition to providing a simplified interface to applications by hiding the underlying PDU structure, is responsible for rearranging out-of-order PDUs and retransmitting lost data. TCP has been devised to be a reliable data stream delivery service; as such it is optimised for accurate data delivery rather than performance. TCP can often suffer from relatively long delays while waiting for out-of-order PDUs and data retransmission in extreme cases, reducing overall application performance and making it unsuitable for use where a maximum PDU transmission delay (jitter) needs to be guaranteed, in file-systems or media delivery for example.

Furthermore, at the lowest layer of the TCP/IP hierarchy, in the network access layer where PDUs are transmitted over the network, a fully compliant IEEE 802.1D standard MAC bridge joining separate networks together, requires that order is preserved for source and destination pairs. PDU duplication is another cause of reduced performance in Ethernet networks. A unicast PDU whose destination route has not been learned by a network bridge will be flooded out to all routes from the bridge and will be buffered on multiple outbound ports at the same time. Network reconfiguration affecting the preferred route from a bridge to the destination can cause a duplicate PDU to be sent from a buffer after a duplicate PDU has already been sent out of the previous preferred route, both arriving at the destination. Again, the higher level TCP protocol will handle this but not without degrading overall performance.

Disordering and duplication should not occur during normal operation. These features of multi-path Ethernet are constrained by the Rapid Spanning Tree Protocol (RSTP) as defined by the IEEE 802.1D standard. The RSTP maintains a preferred route between bridges by disabling alternative routes, removing multiple paths and loops, leaving a single path which ensures in-order frame delivery.

This does not completely remove disordering or duplication. From time to time the STP is reconfigured as the result of a failing or unavailable path between a data source and destination. During reconfiguration there is an increased probability that frames in transit through the network will be disordered or duplicated as a result of the transition from the old to the new routing configuration.

A RSPT enforced, single path Ethernet network performs well under light network traffic load, however it starts to fail as the network traffic load increases and the number of network connected devices increase in number and performance. Many PDUs being sent concurrently across the network for different destinations will have to use the same route within the network. For some network patterns this can be particularly unfortunate for the performance of the system as a whole due to the saturation of this single route and the congestion it ultimately suffers from.

One technique that has been developed to improve the performance of a heavily loaded network is to disable the RSTP which cauterises alternative routes and use dynamically created multi-path routes across the network concurrently. This is called "dynamic routing" with specific methodologies for the dynamic routing often being referred to as "adaptive routing". This is only possible in networks with multiple routes from each source to each destination. Although dynamic routing can significantly improve the total network bandwidth by concurrently utilising multiple routes, it can also cause PDUs sent between a source and destination to be mis-ordered. If the first PDU sent encounters some small amount of network congestion and the second PDU is sent using a different route and does not encounter any congestion then it is possible for the second PDU to arrive at the destination before the first PDU. As already stated this is not good behaviour for TCP/IP PDUs, and the IEEE 802.1 standard forbids the re-ordering of PDUs that are travelling between two MAC address pairs across a Bridge.

DESCRIPTION OF RELATED ART

In WO 99/35791 and WO 99/35793 a packet ordering and fault tolerant mechanism for a network is described which has many characteristics common to TCP. Ordering of packets is controlled by the ingress ports to the network and sequence numbers are employed to maintain order. Hence, packet ordering and adaptive routing is managed externally of the network. This means that the network has only limited capability of responding to localised congestion within the network.

The present invention seeks to overcome the problems encountered with conventional networks and in particular seeks to provide a method of packet ordering in a multi-path network with improved bandwidth. The present invention also seeks to provide a method of packet ordering in a multi-path network which enables dynamic routing of packets across the network.

SUMMARY OF THE INVENTION

The present invention therefore provides a method of transferring data packets across a multi-path network having a plurality of network elements interconnected by network links wherein for each data packet arriving at an egress port of the multi-path network, a delivery acknowledgement is issued by the egress port and is transmitted across the network following in reverse the path taken by the data packet being acknowledged, and wherein the state of each link in the path taken by the data packet being acknowledged is updated by the acknowledgement.

In a preferred embodiment each one of the links in the path of a first data packet being transmitted across the network is individually assigned exclusively to subsequent data packets having the same ordering requirement as said first data packet until an acknowledgement of the most recent preceding data packet is transmitted by an exclusively assigned link.

Also, with the present invention a data packet may be dynamically routed across the multi-path network except where the data packet has ordering requirements matching a preceding data packet for which an exclusively assigned link exists. During its transit across the network a single data packet may be allocated previously selected links by a first group of network elements and may be allocated links dynamically by a second group of network elements.

Preferably, each network link in the multi-path network comprises a plurality of individually selectable link channels for transmitting data packets across the network and wherein a link channel may be individually exclusively assigned to data packets having common ordering requirements until at least one acknowledgement of a data packet is transmitted by an exclusively assigned link channel.

In a preferred embodiment, each network element includes at least one table in which is stored with respect to each link channel the ordering requirements of the most recent data packet transmitted on the link channel. Also, each network element may additionally store, in association with the ordering requirements of a data packet received by a network element, the link channel on which the data packet arrives at a network element.

Ideally, each network element maintains a packet count value in association with each link channel with which it is connected, the packet count value being incrementally adjusted by amounts representative of the data packets transmitted by the link channel. Also, each network element maintains an acknowledgment count value in association with each link channel with which it is connected, the acknowledgement count value being incrementally adjusted by amounts representative of the data packets delivered to network egress ports transmitted by the link channel.

With this preferred embodiment each network element compares the packet count value and the acknowledgement count value for a link channel and where there is a difference between the packet count value and the acknowledgement count value, the link channel remains exclusively assigned to data packets having ordering requirements matching the most recent data packet transmitted by that link channel. Hence, where the packet count value and the acknowledgement count value are equal, the link channel may be made available for allocation to any future data packet.

In a first option, the packet count value may be increased by 1 for each data packet which is transmitted by the link channel and the acknowledgement count value may be increased by 1 for each acknowledgment of a data packet being delivered in order to the final network egress port which is transmitted by the link channel.

In an alternative option, the packet count value and the acknowledgement count value may be increased respectively by amounts representative of the sizes of the data packets and the sizes of the data packets being acknowledged which are transmitted by the link channel.

Ideally, the delivery acknowledgement is triggered by receipt of the header of the data packet. With is embodiment, the header of the data packet contains information on the packet count value for the data packet and the delivery acknowledgement reads the packet count value in the data packet header and generates a delivery acknowledgement including an acknowledgement count value corresponding to the packet count value.

The delivery acknowledgement may consist only of an acknowledgement count value and identification of the acknowledgement's flow channel. Alternatively, the delivery acknowledgement does not require any routing information and does not require either a source address or a destination address, the routing information being distributed amongst the network elements in the path of the data packet being acknowledged.

In a further aspect the present invention provides a multi-path network for use in a network apparatus, such as but not restricted to one or more of a bridge, switch, router, hub or the like, the multi-path network comprising a plurality of network ports; a plurality of network elements; and a plurality of network links interconnecting the network elements and the network ports for transporting data packets, each network egress port including acknowledgement means for issuing a delivery acknowledgement in response to receipt of a data packet and each network element being adapted to transmitted a delivery acknowledgment in the opposite direction along the path taken by the data packet being acknowledged and being further adapted to update the state of at least one of the network links to which it is connected in response to receipt of an acknowledgement.

Preferably, the network links are individually assignable exclusively to data packets having ordering requirements matching the ordering requirements as the most recent data packet transmitted by the network link. Also the network elements may be adapted to dynamically route data packets across the multi-path network except where the data packet has ordering requirements matching a preceding data packet for which an exclusively assigned link exists. The network elements may also include disabling means for disabling the dynamic routing of data packets by the network element with respect to data packets that have ordering requirements matching at least one preceding data packet for which no acknowledgement has been received by the network element.

In a further preferred embodiment each network link in the multi-path network comprises a plurality of individually selectable link channels for transmitting data packets across the network and wherein a link channel is individually exclusively assignable to data packets having common ordering requirements.

Ideally, each network element includes at least one table in which is stored with respect to each link channel the ordering requirements of the most recent data packet transmitted on the link channel. Said at least one table is adapted to store, in association with the ordering requirements of a data packet received by a network element, the link channel on which the data packet arrives at a network element.

Ideally, each network element further includes packet counting means for maintaining a packet count value in association with each link channel with which it is connected, the packet count value being incrementally adjusted by amounts representative of the data packets transmitted by the link channel. Each network element may also further include acknowledgement counting means for maintaining an acknowledgment count value in association with each link channel with which it is connected, the acknowledgement count value being incrementally adjusted by amounts representative of the data packets delivered to network egress ports which were transmitted by the link channel.

With this preferred embodiment each network element further includes a comparator for comparing the packet count value and the acknowledgement count value for a link channel and where there is a difference between the packet count value and the acknowledgement count value, the link channel remains exclusively assigned to data packets having ordering requirements matching the most recent data packet transmitted by that link channel.

Ideally, the packet counting means and the acknowledgement counting means are assigned a common maximum value and wherein the packet counting means and the acknowledgement counting means are adapted to wrap back through zero when the maximum value is exceeded.

Optionally, each one of the plurality of link channels is a duplex link channel permitting packets and/or acknowledgments to be transmitted in opposing directions simultaneously. Alternatively, each one of the plurality of link channels is a half duplex link channel with sideband method to allow acknowledgments to be transmitted in opposing direction.

In a further preferred embodiment the network ports are adapted to issue a delivery acknowledgement immediately on receipt of the header of the data packet. Ideally, the header of the data packet contains information on the packet count value for the data packet and the network ports are adapted to read the packet count value in the data packet header and to generate a delivery acknowledgement including an acknowledgement count value corresponding to the packet count value. Moreover, the network ports may be adapted to issue delivery acknowledgements which consist only of the acknowledgement count value.

In a further aspect the present invention provides an Ethernet bridge or router comprising a multi-path network as described above.

In a still further aspect the present invention provides a method of data delivery across a multi-path network which is adapted for use in a bridge, switch, router, hub or the like, the method comprising dynamically routing data packets across the network and selectively disabling the dynamic routing with respect to data packets that have ordering requirements common to at least one preceding data packet, the ordering requirements may be, but are not limited to, a source to destination address, with or without a level of priority, or a message class.

With the present invention the packet ordering functionality is embedded within the multi-path network and thus is transparent to devices external to the network. Also, the routing information for the acknowledgements of data packets is distributed amongst the network elements which were responsible for the routing of the data packets. This enables the network to be much more responsive to localised congestion as individual BFSs within the network are released, especially those closest to egress network points, even where access to an upstream portion of a path within the network remains restricted.

Similarly, with the present invention the acknowledgements used to maintain packet ordering are also contained within the network and are not required to reach the end nodes of the network before releasing a path through the network for new data packets. With the present invention, therefore, the latency before a BFS is released for further adaptive routing is minimised.

The foregoing and other objects, aspects and advantages will be better understood from the following detailed description of a preferred embodiment of the present invention with reference to the drawings, in which:

DETAILED DESCRIPTION OF THE PREFERRED EMBODIMENT

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs.

In the context of this document the definitions of an intermediate station is extended to include a station capable of forwarding packets encapsulated at the additional protocol layer referred to herein as the Encapsulation Layer. This type of station will be referred to herein as a Bridge Fabric or Network Fabric. A multi-port Bridge Fabric may be implemented by a collection of Bridge Fabric Switches (BFSs) interconnected by Bridge Fabric Switch Links (BFSLs).

Complete encapsulation in a PDU, which is the subject of co-pending United Kingdom patent application number 0807937.8 and which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of the data transmission, acknowledgement and flow-control mechanisms and can be further utilised to provide many other attractive features important to large high performance, scalable Ethernet networks.

Figure 1:
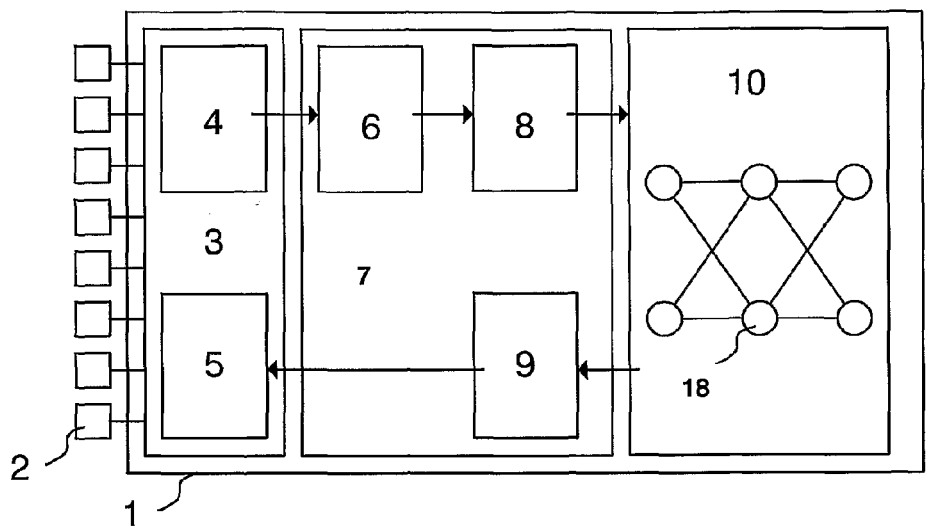
FIG. 1 illustrates schematically an Ethernet bridge which includes a multi-path network in accordance with the present invention.

An Ethernet bridge or router 1 is illustrated in FIG. 1 which may be connected to a plurality of separate Ethernet stations 2 and which implements the encapsulation of both Network Layer and Data Link Layer PDUs in a FPDU. The Ethernet bridge 1 generally comprises a multi-path network 10 in combination with a plurality of Ethernet ports 3 (only one is illustrated for the sake of clarity) with each port being individually connectable to an Ethernet station. The Ethernet ports 3 are generally conventional in design and each includes means for establishing a data connection with an Ethernet station, a receiving means or input 4 for performing Ethernet receive functions and a transmitting device or output 5 for performing Ethernet transmit functions.

The Ethernet ports 3 are connected to a network interface 7 which provides conventional functionality such as packet buffering 6. However, the network interface 7 additionally includes an Ethernet PDU encapsulator 8 which connects the network interface 7 to ingress ports (not shown) of the network 10 and an Ethernet PDU decapsulator 9 which connects egress ports (not shown) of the network 10 back to the Ethernet ports 3. The Ethernet PDU encapsulator 8 implements the protocol of the Encapsulation Layer and thus is responsible for the generation of the FPDUs. Ideally, each port 3 of the Ethernet bridge 1 has a respective network interface 7 and thus a respective Ethernet PDU encapsulator 8 and a respective Ethernet PDU decapsulator 9.

Figure 2:
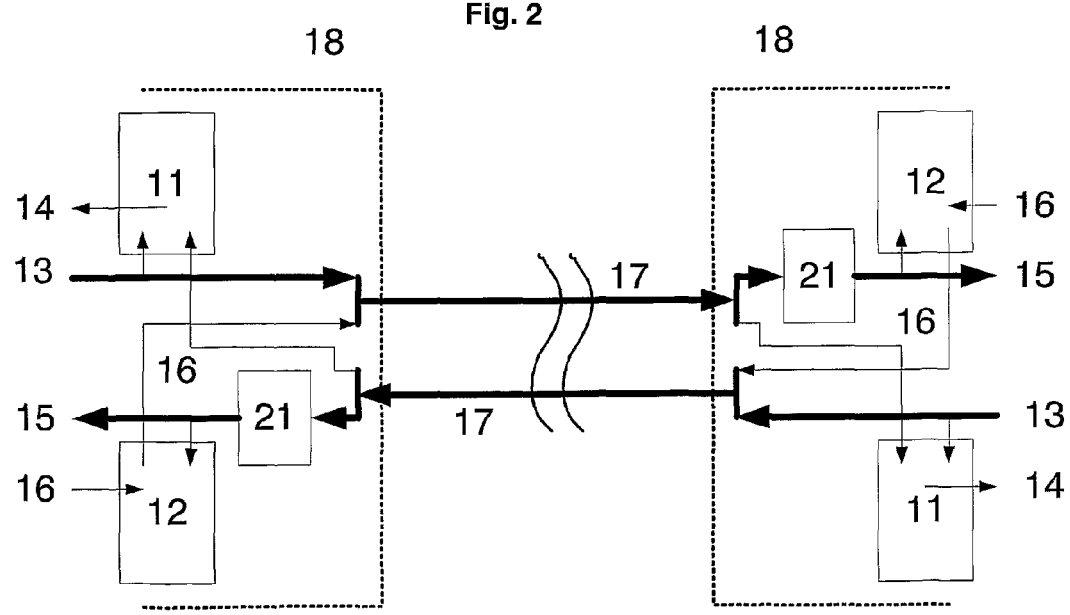
FIG. 2 illustrates schematically the mapping of flow channels onto a bridge fabric switch link (BFSL) in accordance with the present invention.

The network 10, which is a proprietary multi-path network, comprises a plurality of interconnected network elements 18 referred to herein as bridge fabric switches (BFSs) interconnected by network links 17 in the form of bridge fabric switch links (BFSLs). Each BFSL is a bi-directional (full duplex) connection. Data is sent in each direction and acknowledgments and flow control state for data in one direction can be multiplexed with the data sent in the opposite direction of the BFSL. FIG. 2 illustrates a BFLS 17 in combination with the input and output connections to the link 17. Of course, in a large network there will be a large number of BFSs and a packet traversing the network will pass through many BFSs and BFSLs before egress from the network. As mentioned earlier, network packets transmitted across the network fabric are referred to herein as Fabric Protocol Data Units (FPDU) and these correspond to encapsulated Ethernet PDUs.

The multi-path network described herein preserves packet ordering whilst provides dynamic routing, and ideally adaptive routing, of FPDUs across the network and at the same time maximising usage of the bandwidth, even in larger networks. This is achieved, in part, by arranging for a packet acknowledgement to be released immediately the head of the FPDU is received at one or more egress ports. That is to say, release of the FPDU acknowledgement is not delayed until after the entire payload of the FPDU is received. Thus, with the network described herein, while the body of the FPDU is still being transmitted across the network, the acknowledgement is already in transit back to the ingress port of the FPDU. If the FPDU is big enough and the network delivery time is low enough, then the acknowledgement will be received at the ingress port before the ingress port has finished transmitting the whole of the FPDU. The next FPDU can then be sent and adaptively routed without any possibility of it being received before the first and without any possibility of it being duplicated because no network reconfiguration is required to maintain a single route.

Each BFSL of the network has a plurality of "flow channels" to support one or more source to destination connections simultaneously (where the source is defined as an ingress point to the network, and the destination is defined as an egress point (or points) from the network). Having many flow channels increases the amount of time a channel can be held open without having to wait for the acknowledgment to be returned. For example if 64 flow channels are defined for each BFSL then up to 64 source to destination conversations can be active on each link before the link has to block more FPDUs being sent. This effectively means that the round trip delay (the time taken for the head of a packet to cross the whole network and for the acknowledgement for that head to be returned back to the source port) can be 64 times larger than the time it takes to send a small FPDU before the BFSL will have to block sending output data.

The full network source to destination flow of a FPDU uses a series of single flow channels each allocated in turn on each BFSL the FPDU visits as it crosses the network. Whilst the particular flow channel used by an FPDU might differ for each individual BFSL visited, during transit of the FPDU across the network, each flow channel entry on a BFSL has enough state to map the corresponding flow channel of the previous BFSL the FPDU used to arrive at the current flow channel entry. As a result the network, as a whole, records the path of the FPDU as it crosses the network from source to destination.

Figure 3:
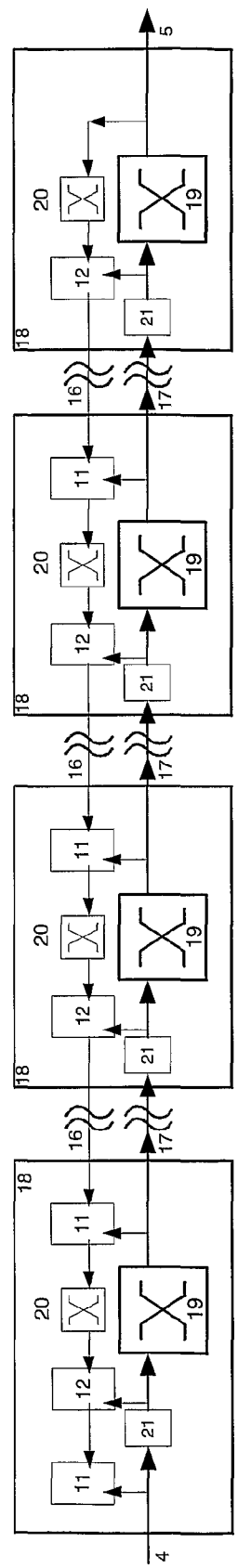
FIG. 3 illustrates a path across a multi-path network involving a series of four bridge fabric switches (BFSs), in accordance with the present invention.
Figure 4:
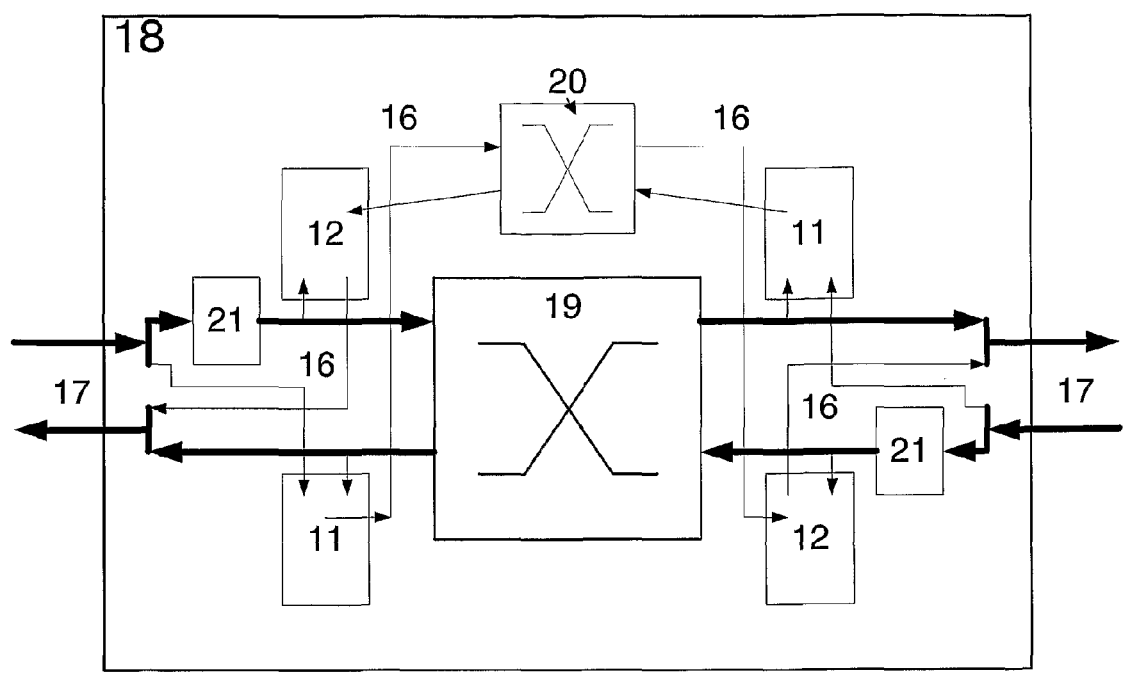
FIG. 4 illustrates schematically a bridge fabric switch BFS used in the multi-path network of the present invention.

FIG. 3 illustrates a path from a network ingress port 4 to a network egress port 5. In FIG. 3 separate flow channels are shown which support the FPDU communication. The first flow channel is wholly in the first BFS 18 next to the ingress port 4. The other three flow channels straddle the BFSL between each of the BFS 18. For simplicity in FIG. 3 only the FPDU channel 17 and the acknowledgment path 16 are shown although it is expected that a full duplex BFSL would normally be used as shown in FIGS. 2 and 4.

Each flow channel is mapped onto a BFSL 17 and each BFS at each end of the BFSL 17 includes a first state table 11 in the form of an output flow channel table (OFCT) and a second state table 12 in the form of an input flow channel table (IFCT) in which entries specific to each flow channel of the BFSL 17 are recorded and stored until over-written. Each location in the OFCT 11 has an associated location in the IFCT 12 in the form of a directly corresponding location in the IFCT 12. For example OFCT entry 3 corresponds to IFCT entry 3. Moreover, some of the IFCT state is a copy of the OFCT state and some of the OFCT state is a copy of the IFCT state. In use, output data 13 is multiplexed with acknowledgment values 16 relating to FPDUs transmitted in the opposite direction to create the BFSL data stream and at the next BFS 18 the input data 15 to the BFS 18 is separated from acknowledgments 16 concerning FPDUs transmitted in the other direction.

FPDUs received from a BFSL are buffered in a buffering device 21, preferably a FIFO, while they wait to make a connection to the data crossbar switch 19. The flow channel number of the received acknowledgments 16 is used to index the OFCT 11 to retrieve the mapping of the previous BFSL and this is appended to form a routable acknowledgment 14 that is sent to the acknowledgment crossbar switch 20 shown in FIGS. 3 and 4.

With the multi-path network described herein, a "source to destination" connection is dynamically established across the whole network as a first FPDU travels across the network and then remains exclusively allocated to subsequent FPDUs having the same ordering requirement whilst any preceding FPDUs with the same ordering requirements remains in transit. The ordering requirements may be, but are not limited to the following: a source to destination address, with or without a level of priority; a message class; VLANS; higher level protocol requirements; IP numbers; or quality of service. This is achieved by storing in the OFCT 11 a destination address value and state which describes the upstream path, back towards the source ingress port, for the most recent FPDU transmitted by a flow channel of the BFSL 17. Thus, in the OFCT 11 a plurality of destination address values and states for a plurality of FPDUs are stored each destination address value and state being stored in association with a respective flow channel of the BFSL.

Figure 5:
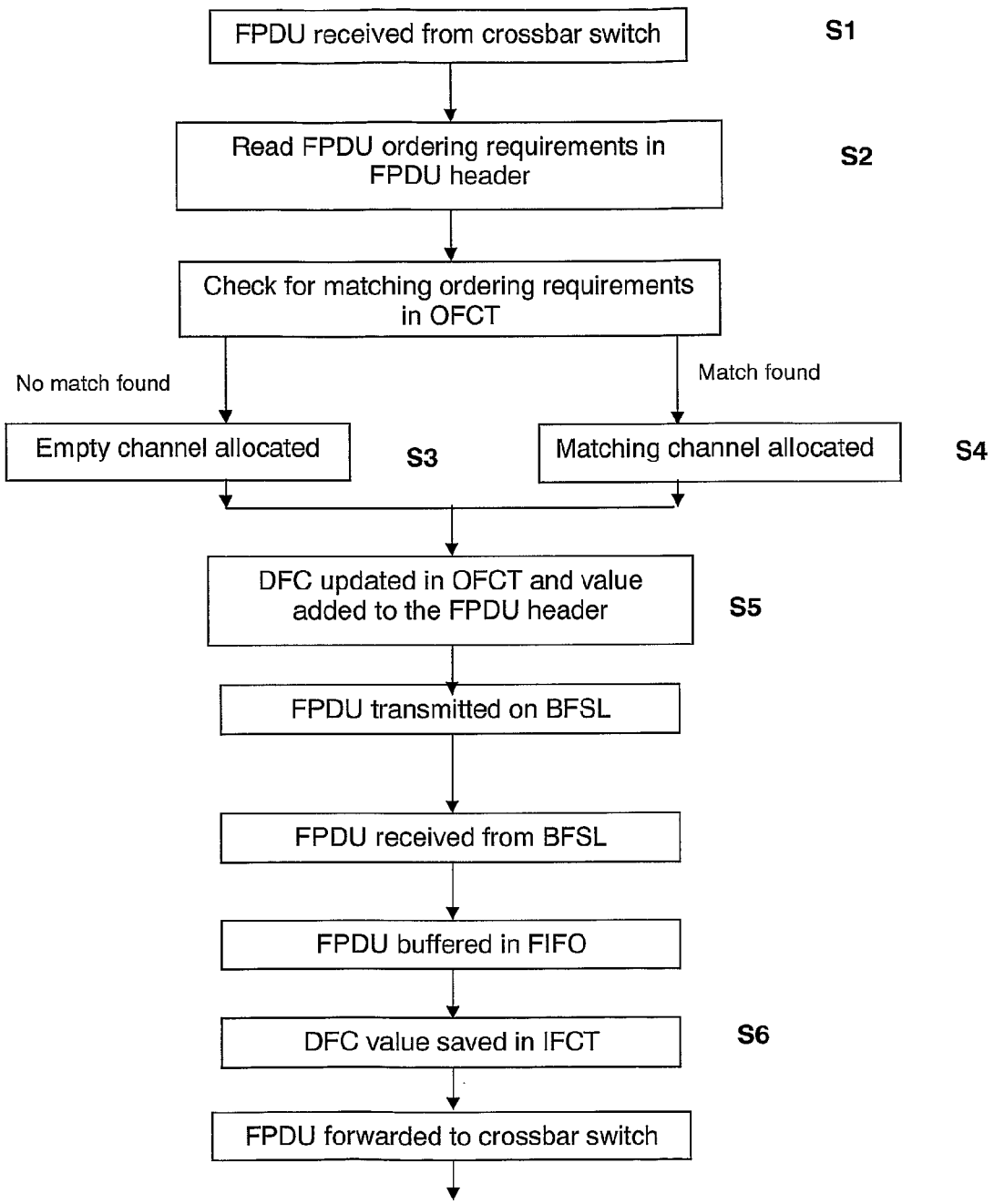
FIG. 5 is a flow diagram of the method steps in accordance with the present invention for allocating a flow channel of a BFSL to an FPDU being transmitted across the multi-path network.

In FIG. 5 the basic methodology for transmitting an FPDU on one or more BFSLs of a plurality of BFSLs of a network fabric, are illustrated. When a new FPDU is received S1 for transmission on the BFSL 17, the header data of the new FPDU is checked S2 to see if the FPDU's ordering requirements match any of the valid channels of that BFSL. This match is executed by performing a parallel compare of all the entries in the OFCT 11. Each compare is an equality test between the ordering requirement in the header of the FPDU and the ordering requirement stored in the OFCT 11. Each compare also requires an equality test of the source port and source flow channel the FPDU has come from.

If no match exists then an empty/unused channel is allocated S3 and the input port of the BFS, the flow channel of the BFSL and ordering requirement data of the FPDU are stored in relation to the allocated channel in the OFCT 11. The empty/unused channel may be allocated by the BFS randomly or quasi-randomly or may be allocated using one or more predefined rules. If a match does exist, then the FPDU is allocated the same flow channel S4 that most recently carried a previous FPDU with matching ordering requirement data. The state of the allocated channel is then updated in the OFCT 11 with information representative of the new FPDU (which is described in greater detail below).

FIG. 4 shows how the individual flow channels of a BFSL are mapped into a BFS 18. Each BFS 18 has a data crossbar switch 19 that is used to transport data from an input BFSL 17 to an output BFSL 17. Each BFS 18 also has an acknowledgment crossbar switch 20, in parallel with the data crossbar switch 19, which is used to return BFSL acknowledgment tokens back from a network egress port to the network ingress port. As mentioned earlier, the OFCT 11 holds for each flow channel the return address for the most recently transmitted FPDU. This return address is in two parts: it has the port number the FPDU came from and also the flow channel assigned on the previous BFSL. The return address is used for the acknowledgement token of that FPDU to direct the acknowledgment from the BFS data output port through the acknowledgment crossbar switch 18 into the IFCT 12 where it can be directed as a new acknowledgement token back to the next BFS in the acknowledgement's return path towards the ingress port for that FPDU.

Each flow channel is assigned a count value representative of the number of units of data transmitted which is referred to herein as the Data Flow Count (DFC). The DFC value is incremented by the size of the FPDU being transmitted. The count value of each of the flow channels is held at both ends of the BFSL 17. The DFC has a master value at the sending end of the BFSL and a slave (copy) value at the receiving end. Thus, for data the master DFC value is held in the OFCT 11 and the slave DFC value is held in the IFCT 12. Each flow channel is also assigned a count value representative of the number of acknowledged units of data which is referred to herein as the Acknowledgement Flow Count (AFC). The AFC master value is held in the IFCT 12 and the AFC slave value is held in the OFCT 11. When the DFC reaches a predetermined maximum value it simply wraps back through zero. Overflow on the DFC is acceptable as it is only ever compared against the AFC that will also wrap back through zero in the same way as it is assigned the same predetermined maximum value.

The unit measure of data is set as a predetermined number of bytes. This unit measure is set small enough to give reasonable resolution but big enough to minimise state and overhead on the size of headers in the FPDUs and the size of the acknowledgements returned. In one embodiment it is envisaged that the count values correspond to a count of whole FPDUs, instead of the total data size held in the FPDUs. This gives the same understanding of FPDU ordering but removes the knowledge of total data against the flow channel.

Once a new FPDU has been allocated a flow channel and is to be output on that flow channel, the number of units of data being sent in the FPDU is calculated from the size field in the FPDU header. The master DFC value stored in the OFCT 11 in relation to the flow channel allocated to that FPDU is then incremented by the number of units of data being sent in the FPDU. Furthermore, the new DFC value is inserted into the header of the FPDU S5 for transmission on the BFSL 17. Once the PFDU is received at the next BFS, the DFC value is read from the FPDU header and loaded S6 into the slave data flow count value held in the IFCT 12 of that BFS.

A similar rolling count value is established in relation to the returning acknowledgement which is described in greater detail below. At any moment in time, the channel count value is calculated by taking the difference between the two rolling count values that are part of the state of the flow channel. Before any FPDUs are enabled for transmission all the DFC and AFC stored in the OFCT 11 and the IFCT 12 are initialised to the same value making the difference between the rolling count values equal to zero. Once initialised the DFC and AFC values are then only changed by the passing FPDU data and acknowledgments using the BFSL.

When the header of the FPDU is received at the final destination egress port of the network fabric, an acknowledgement is immediately returned. As mentioned earlier, issuance of the acknowledgement is not delayed pending receipt of the entire payload of the FPDU. The acknowledgement is automatically routed back to the original ingress port following in reverse the path taken by the FPDU in the forward direction. This is done using the input port number and input flow channel number stored in each of the OFCTs 11.

Figure 6:
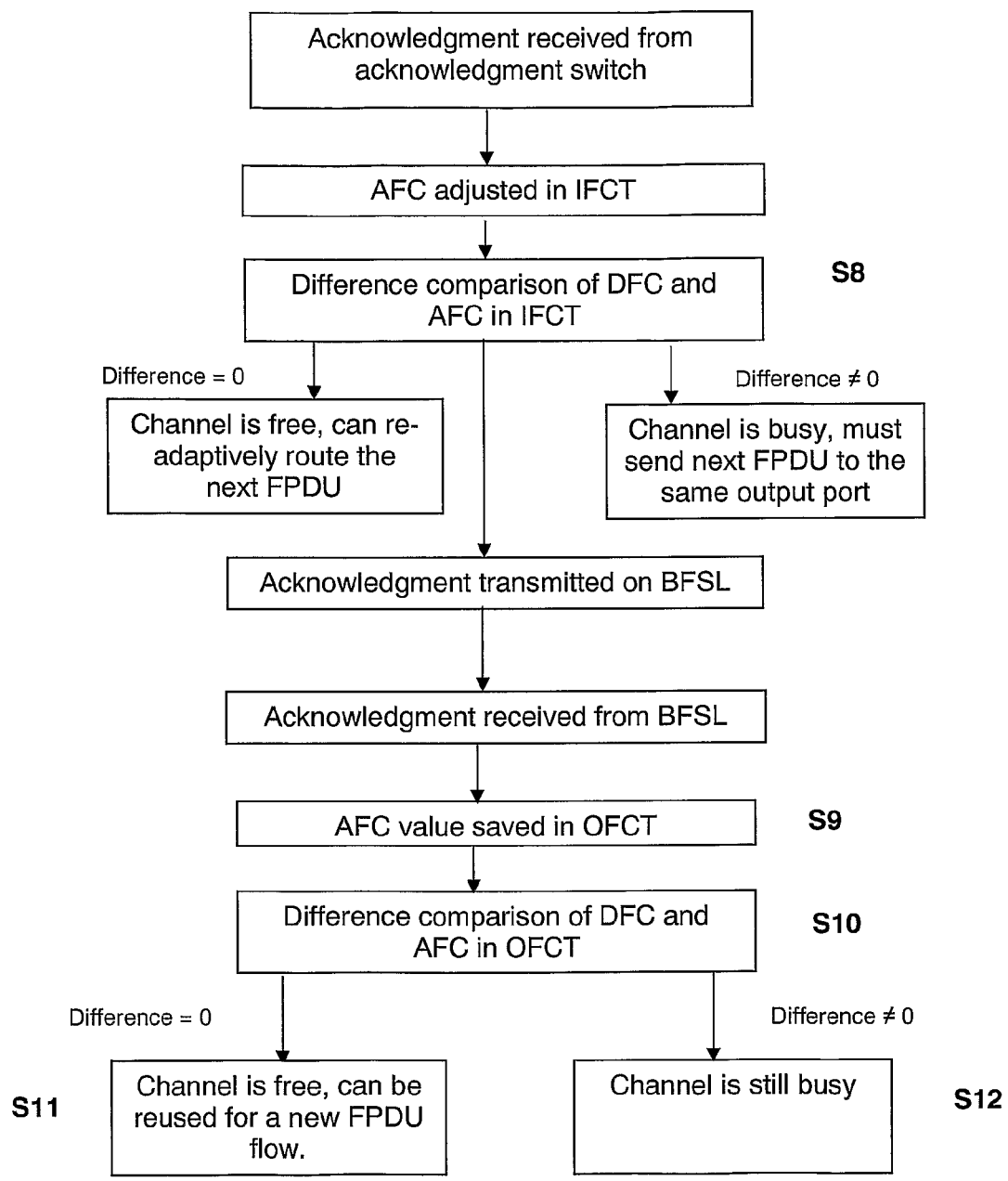
FIG. 6 is a flow diagram of the method steps in accordance with the present invention for issuing a FPDU acknowledgement across the multi-path network.

The acknowledgement includes information taken from the header of the FPDU that generated the acknowledgement on the unit size value of the FPDU. As illustrated in FIG. 6, during the transit of the acknowledgement across the network fabric back to the ingress port, at each BFSL 17 in the reverse path the second rolling master AFC value, stored in the IFCT 12 is adjusted by the size value held in the returning acknowledgement S8. Likewise, this master AFC value is included in the acknowledgment token returned on the BFSL 17 and is loaded into the slave AFC value held in the OFCT 11 S9.

As already stated the difference between the two rolling counts indicates the total amount of unacknowledged data. The values can be compared S10 in either the OFCT 11 or the IFCT 12. It should be noted that, due to the transmission delay along a BFSL the DFC value is updated in the OFCT 11 before it is copied into the IFCT 12 and likewise the AFC is updated in the IFCT 12 before it is copied into the OFCT 11. This has the effect of making the comparison of the Master DFC value and the Slave AFC in the OFCT 11 appear to be different for longer than the comparison of the Slave DFC value and the Master AFC value in the IFCT 12.

When the comparison of the rolling counts produces a zero difference S11, then all the FPDUs sent along the flow channel of this BFSL for this source/destination pair have been acknowledged as being at least accepted by the destination port. This means that a following FPDU with the same ordering requirement may be dynamically routed safely, using alternative flow channels and an alternative path across the network fabric, without the risk of the following FPDU reaching the destination port or ports out of order with respect to earlier FPDUs transmitted across the network fabric having the same destination. This also means that when the difference between the rolling counts is zero, the flow channel is considered empty and can be re-used for another ordered flow. It should be noted that the rolling count values are not reinitialised from one FPDU to the next even if the difference becomes zero and the channel is empty. The next flow that re-uses the flow channel adopts the new starting values that are probably non-zero but start with a count difference of zero.

If the difference between the counts is not zero S12, then it is not safe to adaptively route a new FPDU having the same ordering requirements as there is a risk that it might arrive at the egress port out of order. In this case the new FPDU must be routed along the same path, using the same flow channel, as the previous FPDU for this source/destination. This is done by using the destination port number or other number with ordering requirements stored in the IFCT 12 which was loaded the first time a connection was made on the data crossbar 19 for an FPDU having the same ordering requirements.

As a general principle, because the network has multiple routes from a network ingress port to a network egress port then dynamic routing is desirable. This is because dynamic routing significantly improves the total usable bandwidth of a network when unpredictable or irregular network connections are made as it allows the PDUs to be routed around localised congestion hot spots. Usually dynamic routing can be used at an early stage in the delivery of the FPDU where many output ports of a BFS can be considered as a reasonable choice to deliver the FPDU closer to its destination. However, as can be seen, with the method and network fabric described herein dynamic routing is selectively disabled for a series of FPDUs having a common ordering requirement where no acknowledgement has been received, in order to maintain packet ordering. If the FPDU arrives at the input port of a BFSL on an 'empty' flow channel, i.e. a flow channel for which no valid address or state data is stored in the OFCT 11 or the IFCT 12 indicated by the DFC being equal to the AFC, then the FPDU can be the subject of conventional dynamic/adaptive routing. In this case, the data crossbar switch 19 of the receiving BFS 18 will connect to any one of the permissible output ports. The number of the successful output port number is then communicated back to the BFSL input port so that it can be loaded as an entry in the IFCT 12. This ensures that a subsequent FPDU that arrives on the same flow channel will be directed to the same output port if the acknowledgement of the first FPDU has not yet been received.

With the network fabric described herein many small FPDUs can be sent into an adaptive network fabric and the FPDUs will all be delivered in the same order when they have the same ordering requirement. Any FPDUs being sent from a different source or being sent to a different destination or where there is no ordering requirement will also be adaptively routed giving better performance overall for the network. For large FPDUs as receipt of the header will be acknowledged before the end of the FPDU is sent, this allows the next FPDU to be adaptively routed by those BFSLs which have received the acknowledgement as it follows the return path back to the ingress port of the large FPDU.

If the network has many interconnecting segments then BFSLs closer to the destination are more likely to have all their FPDUs fully acknowledged as the FPDUs arrive here later and the acknowledgement will pass earlier. So even if BFSLs close to the source are unable to adaptively route, later stages may still be able to send the FPDUs a different way across the network. Thus a single FPDU may experience predefined routing close to the ingress port of the network but may then become subject to dynamic routing as it approaches its egress port or ports.

It may also be appreciated that each flow channel has the count value in two parts: this makes them more robust to errors on the individual BFSLs. The first value of the count is sent in the header of the FPDU and the second value of the count is sent with the acknowledgement token. If an error occurs, corrupting the header of the FPDU, or the acknowledgement then the value can be safely discarded and then resent later either with the next FPDU/acknowledgement or as a regular update without breaking the true value of outstanding unacknowledged FPDU data.

The number of individually selectable flow channels for each BFSL is determined so that the return latency of many small FPDUs, sent to different destinations, can be hidden in a reasonably large network without significantly reducing the bandwidth. This calculation needs to take into account the size of the smallest FPDUs, the bandwidth of individual BFSLs and the latency of transmission across the BFS components and along each BFSL.

If a series of FPDUs being transmitted from one network ingress port to another network egress port are not making good progress, perhaps because of network congestion close to the destination, then an adaptive re-selection can be forced. This would cause the FPDU data stream to take another route across the network and perhaps avoid the congestion. To force an adaptive selection of an alternative route, the FPDU data stream is blocked at a BFS until all the previously sent FPDUs have been acknowledged and the flow channel appears empty. This blocking is achieved by preventing any new data connections from being made across the data crossbar switch 19. The blocked FPDUs will be buffered in the data input FIFO 21 waiting to connect to the data crossbar switch 19. All the FPDUs already sent across the crossbar switch will eventually reach the network egress ports and then all the acknowledgments will be returned. When the last acknowledgment arrives back at the IFCT next to the blocked data flow it is safe to re-adaptively route the FPDU on the crossbar of the BFS and unblock the data stream. The flow channels used on the BFSLs before the blocking BFS will not appear empty while data is buffered in the data input FIFO.

The features of the method and the network described above do not address network functionality for managing the point of congestion nor is the network functionality for managing a failure within the network fabric described. The scope of the present invention presumes successful, albeit possibly delayed, delivery. The subject of the present invention is the propagation of packet delivery knowledge across but within the network fabric to preserve packet ordering. The present invention is also concerned with the dynamic routing of FPDUs across the network in combination with the disabling of dynamic routing functionality where a series of FPDUs having the same ordering requirement are input to the network. The mechanism for packet ordering is embedded within the network fabric and as such is transparent to all devices external of the actual fabric. No packet ordering functionality is required in advance of an FPDU being supplied to an ingress port of the network.

Thus, management of acknowledgements is contained within the network fabric. The delivery acknowledgements are not communicated beyond the ports of the network fabric and indeed it is not necessary for acknowledgements to be transmitted all the way back to the ingress port of the network. The furthermost BFS in any path through the network fabric requiring an acknowledgement is the first BFS after the ingress port. Furthermore, the minimum data contained in the acknowledgement consists of the unit size of the FPDU being acknowledged. The delivery acknowledgement does not contain any of the payload of the FPDU. It also does not contain the source or ordering values of the FPDU it is acknowledging nor its own source and/or destination. All other necessary information arises inherently from the path followed by the acknowledgement. Thus, the size of the acknowledgement is minimised through the use of the flow channel data stored in the OFCT 11 and the IFCT 12 at each BFS.

Figure 7A:
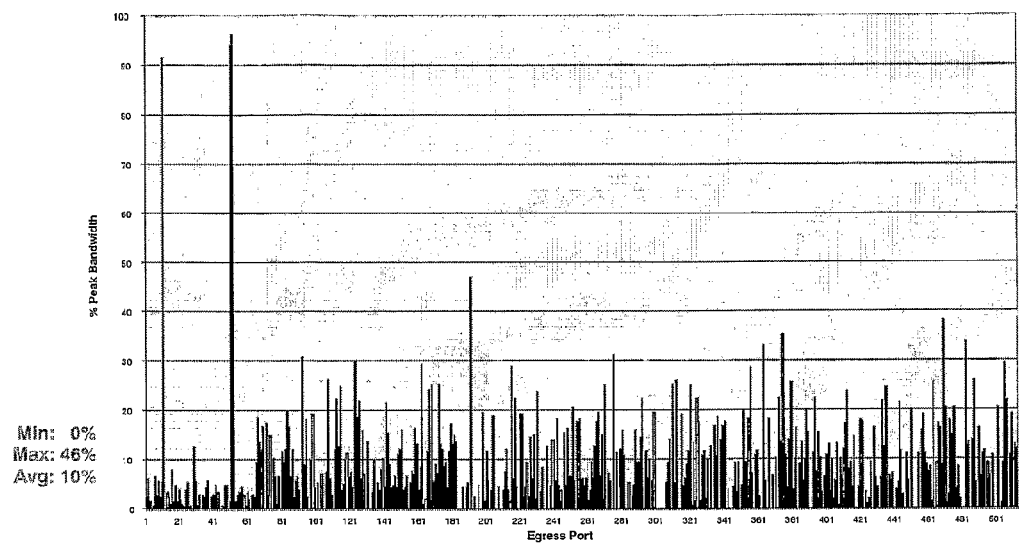
FIGS. 7a, 7b and 7c are graphical representations, for comparison purposes, of the results of simulations of three different network models and shows performance with respect to percentage usage of bandwidth.
Figure 7B:
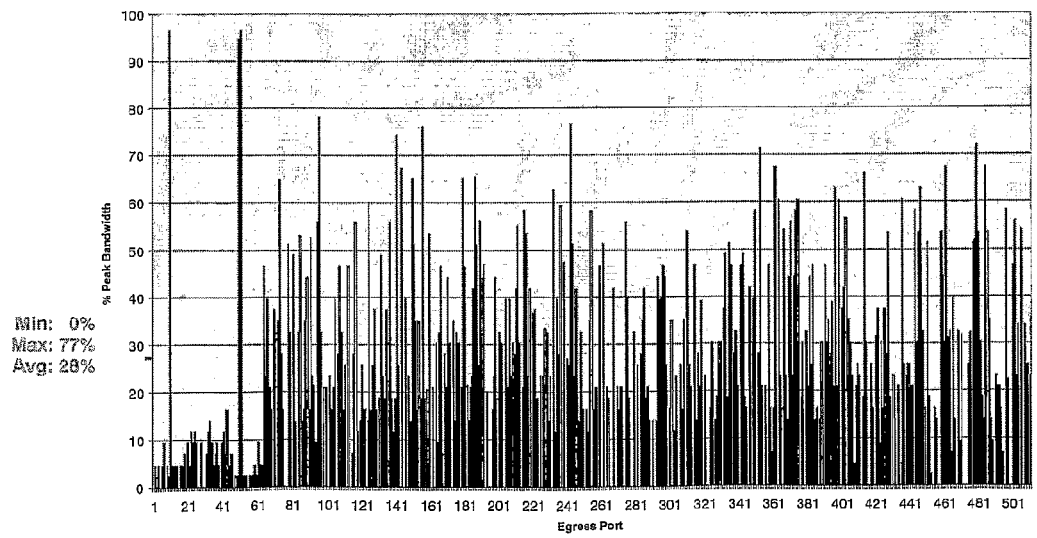
Figure 7C:
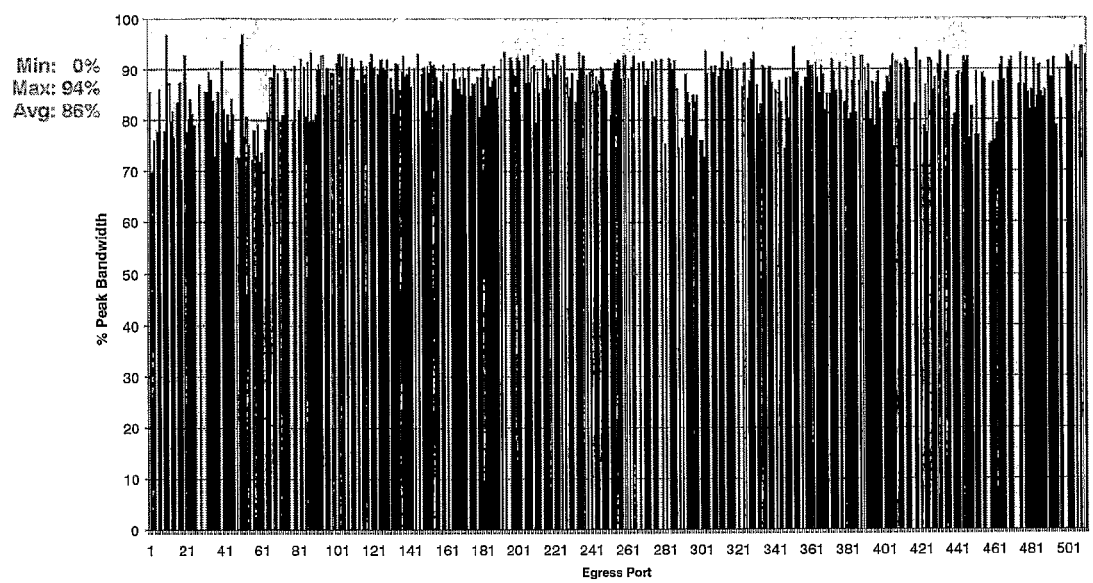

In FIGS. 7a, 7b and 7c the substantial and significant improvement in performance of an Ethernet bridge implementing the present invention is clearly illustrated. FIG. 7a is a graphical representation of the results of computer modelling of the performance of a conventional Ethernet bridge having 512 egress ports. The performance is measured in terms of the percentage usage of the peak bandwidth of each egress port. In FIGS. 7b and 7c equivalent performance modelling is illustrated in respect of a known proprietary, non-Ethernet, bridge and an Ethernet bridge in accordance with the present invention, respectively. As these figures show, the performance average for a conventional Ethernet bridge is as little as 10%. Even with proprietary bridges the performance average remain low at 28% albeit with a much greater variation in performance across individual channels and a much higher maximum achievable occasionally. With the present invention, on the other hand, the performance average is a factor of in excess of eight times greater than that of a conventional Ethernet bridge and three times greater than the known proprietary network. The average performance achievable with the present invention is calculated to be 86% with a maximum performance of 94%. Moreover, further developments to the present invention outside of the scope of this document anticipate further performance improvements with an average as high as 99%.

The multi-path network described herein is truly scalable offering from 256 ports or fewer up to 48,000 ports or more. A single Ethernet bridge or router using the method described herein is capable of providing greatly increased connectivity in comparison to conventional Ethernet bridges. For example, currently the largest 10 Gbe Ethernet bridges (which are modular in construction) offer only 288 ports. With the network of the present invention, a single Ethernet bridge is possible which is capable of operating at 10 Gbe or above and is capable of offering, for example, 48,000 ports. Although reference has been made herein to an Ethernet bridge or router it will, of course, be apparent that the present invention may be applied to any multi-path network which transports data packets between inputs and outputs to the network. Also, although the multi-path network has been described with respect to full duplex link channels, the link channels may alternatively comprise a half duplex link channel with a sideband to allow acknowledgments to be transmitted in the opposing direction.

It is to be understood that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

The invention claimed is:

1. A method of transferring data packets across a multi-path network having a plurality of network elements interconnected by network links, the method comprising for each data packet arriving at an egress port of the multi-path network via a path having one or more network links, issuing a delivery acknowledgement from the egress port concerned and transmitting the delivery acknowledgment across the network following in reverse the path taken by the data packet being acknowledged, and updating a state of the or each network link in the path taken by the data packet being acknowledged in response to receipt of such a delivery acknowledgement, wherein each network link in the multi-path network comprises a plurality of individually selectable link channels for transmitting data packets across the network and wherein a link channel may be individually exclusively assigned to data packets having common packet ordering requirements until at least one acknowledgement of a data packet is transmitted by an exclusively assigned link channel, wherein each network element maintains an acknowledgment count value in association with each link channel with which it is connected, the acknowledgement count value being incrementally adjusted by amounts representative of the data packets delivered to network egress ports transmitted by the link channel, and wherein each network element compares the packet count value and the acknowledgement count value for a link channel and wherein the link channel remains exclusively assigned to data packets having packet ordering requirements matching the most recent data packet transmitted by that link channel when there is a difference between the packet count value and the acknowledgement count value for said link channel.

2. The method of claim 1, wherein the or each network link in the path of a first data packet being transmitted across the network is individually assigned exclusively to subsequent data packets having the same packet ordering requirement as said first data packet until a delivery acknowledgement of the most recent preceding data packet having the same packet ordering requirement is transmitted by an exclusively assigned link.

3. The method of claim 2, wherein a data packet is dynamically routed across the multi-path network except where the data packet has packet ordering requirements matching a preceding data packet for which an exclusively assigned link exists.

4. The method of claim 3, wherein during its transit across the network a single data packet may be allocated previously selected links by a first group of network elements and may be allocated links dynamically by a second group of network elements.

5. The method of claim 3, wherein the dynamic routing of data packets across the network by a network element is selectively disabled with respect to data packets that have packet ordering requirements matching at least one preceding data packet for which no acknowledgement has been received by the network element.

6. The method of claim 1, wherein each network element includes at least one table, the method comprising, for each network element, storing the packet ordering requirements, with respect to each link channel, of the most recent data packet transmitted on the link channel.

7. The method of claim 6, wherein each network element additionally stores, in association with the packet ordering requirements of a data packet received by a network element, the link channel on which the data packet arrives at a network element.

8. The method of claim 1, wherein each network element maintains a packet count value in association with each link channel with which it is connected, the packet count value being incrementally adjusted by amounts representative of the data packets transmitted by the link channel.

9. The method of claim 1, wherein the link channel is made available for allocation to any future data packet when the packet count value and the acknowledgement count value are equal.

10. The method of claim 8, wherein the packet count value is increased by for each data packet which is transmitted by the link channel.

11. The method of claim 8, wherein the acknowledgement count value is increased by for each acknowledgment of a data packet being delivered in order to the egress port which is transmitted by the link channel.

12. The method of claim 8, wherein the packet count value and the acknowledgement count value are increased respectively by amounts representative of the sizes of the data packets and the sizes of the data packets being acknowledged which are transmitted by the link channel.

13. The method of claim 1, wherein each one of the plurality of link channels is a duplex link channel permitting signals to be transmitted in opposing directions simultaneously.

14. The method of claim 1, wherein the delivery acknowledgement is triggered by receipt of the header of the data packet.

15. The method of claim 14, wherein the header of the data packet contains information on the packet count value for the data packet and wherein receipt of the delivery acknowledgement causes the packet count value in the data packet header to be read and a delivery acknowledgement including an acknowledgement count value corresponding to the packet count value to be generated.

16. The method of claim 15, wherein the delivery acknowledgement consists only of an acknowledgement count value and identification of the acknowledgement's flow channel.

17. The method of claim 15, wherein the delivery acknowledgement does not require any routing information and does not require either a source address or a destination address, the routing information being distributed amongst the network elements in the path of the data packet being acknowledged.

18. A method of preserving packet ordering in a multi-path network having a plurality of network elements interconnected by network links, the method comprising the transfer of data packets across the network according to claim 1.

19. A multi-path network for use in a network apparatus, the multi-path network comprising a plurality of network egress ports; a plurality of network elements; and a plurality of network links interconnecting the network elements and the network egress ports for transporting data packets via a path having one or more network links, each network egress port including acknowledgement means operable to issue a delivery acknowledgement in response to receipt of a data packet and each network element being adapted to re-transmit a delivery acknowledgment in response to receipt of such a delivery acknowledgement in a reverse direction along a path taken by the data packet being acknowledged, and each network element being further adapted to update the state of at least one of the network links to which it is connected in response to receipt of an acknowledgement, wherein each network link in the multi-path network comprises a plurality of individually selectable link channels for transmitting data packets across the network and wherein a link channel is individually exclusively assignable to data packets having common packet ordering requirements, wherein each network element further includes packet counting means for maintaining a packet count value in association with each link channel with which it is connected, the packet count value being incrementally adjusted by amounts representative of the data packets transmitted by the link channel, wherein each network element further includes acknowledgement counting means for maintaining an acknowledgment count value in association with each link channel with which it is connected, the acknowledgement count value being incrementally adjusted by amounts representative of the data packets delivered to network egress ports which were transmitted by the link channel, and wherein each network element further includes acknowledgement counting means for maintaining an acknowledgment count value in association with each link channel with which it is connected, the acknowledgement count value being incrementally adjusted by amounts representative of the data packets delivered to network egress ports which were transmitted by the link channel, and wherein each network element further includes a comparator for comparing the packet count value and the acknowledgement count value for a link channel and where there is a difference between the packet count value and the acknowledgement count value, the link channel remains exclusively assigned to data packets having packet ordering requirements matching the most recent data packet transmitted by that link channel.

20. The multi-path network of claim 19, wherein the network apparatus comprises one or more of a bridge, switch, router or hub.

21. The multi-path network of claim 19, wherein the network links are individually assignable exclusively to data packets having packet ordering requirements matching the packet ordering requirements as the most recent data packet transmitted by the network link.

22. The multi-path network of claim 19, wherein the network elements are adapted to dynamically route data packets across the multi-path network except where the data packet has packet ordering requirements matching a preceding data packet for which an exclusively assigned link exists.

23. The multi-path network of claim 21, wherein the network elements includes disabling means for disabling the dynamic routing of data packets by the network element with respect to data packets that have packet ordering requirements matching at least one preceding data packet for which no acknowledgement has been received by the network element.

24. The multi-path network of claim 19 wherein each network element includes at least one table factoring the packet ordering requirements, with respect to each link channel, of a most recent data packet transmitted on the link channel.

25. The multi-path network of claim 24, wherein said at least one table which is adapted to store, in association with the packet ordering requirements of a data packet received by a network element, the link channel on which the data packet arrives at a network element.

26. The multi-path network of claim 19, wherein the packet counting means and the acknowledgement counting means are assigned a common maximum value and wherein the packet counting means and the acknowledgement counting means are adapted to wrap back through zero when the maximum value is exceeded.

27. The multi-path network of claim 19, wherein each one of the plurality of link channels is a duplex link channel permitting packets or acknowledgments to be transmitted in opposing directions simultaneously.

28. The multi-path network of claim 19, wherein each one of the plurality of link channels is a half duplex link channel with a sideband to allow acknowledgments to be transmitted in opposing direction.

29. The multi-path network of claim 19, wherein the network ports are adapted to issue a delivery acknowledgement immediately on receipt of the header of the data packet.

30. The multi-path network of claim 29, wherein the header of the data packet contains information on the packet count value for the data packet and wherein the network ports are adapted to read the packet count value in the data packet header and to generate a delivery acknowledgement including an acknowledgement count value corresponding to the packet count value.

31. The multi-path network of claim 30, wherein the network ports are adapted to issue delivery acknowledgements consists only of the acknowledgement count value.

32. An Ethernet bridge or router comprising a multi-path network as claimed in claim 19.

* * * * *

UNITED STATES PATENT AND TRADEMARK OFFICE
CERTIFICATE OF CORRECTION

| | | |
|---|---|---|
| PATENT NO. | : 8,774,063 B2 | Page 1 of 1 |
| APPLICATION NO. | : 12/992875 | |
| DATED | : July 8, 2014 | |
| INVENTOR(S) | : Jon Beecroft | |

It is certified that error appears in the above-identified patent and that said Letters Patent is hereby corrected as shown below:

In the Claims

Column 16, line 6, (in claim 10,):

After "increased by", insert -- 1 --

Column 16, line 9, (in claim 11,):

After "increased by", insert -- 1 --

Signed and Sealed this
Twenty-first Day of October, 2014

Michelle K. Lee
*Deputy Director of the United States Patent and Trademark Office*